United States Patent
Fujioka

[11] Patent Number: 5,222,232
[45] Date of Patent: Jun. 22, 1993

[54] APPARATUS AND METHOD FOR MONITORING PROM ACCESS IN A MICROCOMPUTER

[75] Inventor: Shuzo Fujioka, Hyogo, Japan

[73] Assignee: Mitsubishi Denki Kabushiki Kaisha, Tokyo, Japan

[21] Appl. No.: 146,986

[22] Filed: Jan. 22, 1988

[30] Foreign Application Priority Data

Jul. 7, 1987 [JP] Japan .............................. 62-170125

[51] Int. Cl.⁵ .................................................. G06F 11/34
[52] U.S. Cl. .................................... 395/575; 371/28; 364/DIG. 1; 364/232.8; 364/249; 364/264
[58] Field of Search ................... 364/431.12, 200, 900; 371/21, 10.1, 21.1, 21.4, 28, 29.1, 16.5, 13; 365/185, 228, 236; 360/31; 377/26, 15; 235/380; 395/425, 575

[56] References Cited

U.S. PATENT DOCUMENTS

| | | | |
|---|---|---|---|
| 3,059,266 | 10/1962 | Cleveland | 371/13 |
| 3,818,461 | 6/1974 | Ward et al. | 364/900 |
| 4,059,748 | 11/1977 | Violino | 371/13 |
| 4,206,346 | 6/1980 | Hirosawa et al. | 377/26 |
| 4,366,541 | 12/1982 | Mouri et al. | 364/431.12 |
| 4,430,735 | 2/1984 | Catiller | 371/28 |
| 4,503,538 | 3/1985 | Fritz | 371/28 |
| 4,534,018 | 8/1985 | Eckert et al. | 365/228 |
| 4,553,252 | 11/1985 | Egendorf | 364/900 |
| 4,559,637 | 12/1985 | Weber | 364/431.12 |
| 4,578,774 | 3/1986 | Muller | 364/900 |
| 4,641,277 | 2/1987 | Yata et al. | 364/900 |
| 4,710,882 | 12/1987 | DiGiulio et al. | 364/900 |
| 4,734,568 | 3/1988 | Watanabe | 235/380 |
| 4,740,890 | 4/1988 | William | 364/200 |
| 4,760,575 | 7/1988 | Watanabe | 371/21 |
| 4,800,528 | 1/1989 | Geddes | 365/185 |
| 4,829,169 | 5/1989 | Watanabe | 235/380 |

Primary Examiner—Debra A. Chun
Attorney, Agent, or Firm—Townsend and Townsend

[57] ABSTRACT

Each time a programmable read only memory is written, the memory device of the programmable read only memory is degraded a certain extent.

This invention relates to a microcomputer having a programmable read only memory. The programmable read only memory includes a special area for recording the number of writes to a user operating area and for monitoring the life of the programmable read only memory.

1 Claim, 2 Drawing Sheets

APPARATUS AND METHOD FOR MONITORING PROM ACCESS IN A MICROCOMPUTER

BACKGROUND OF THE INVENTION

1. Field of the Invention

This invention relates to a microcomputer having a programmable read only memory, and more particularly to a microcomputer for checking a number of writes to the programmable read only memory (PROM).

2. Description of the Prior Art

For example, it will be observed from FIG. 3 that a conventional microcomputer has a programmable read only memory.

Referring to the drawings, PROM(2), RAM(3), PIO(4) and SIO(5) are interconnected to a central processing unit (CPU)(1) by a control bus A, an address bus B and a data bus C, then all of them are integrated in a package.

As to the above-mentioned one chip microcomputer, a user is able to write into the PROM and use it as suits its own purpose.

Generally speaking, in the case of writing into a PROM, the PROM is provided with a high voltage, higher than the usual operating voltage, and the PROM is broken down after a number of writes to a memory location. It is therefore necessary for a broken down PROM to be exchanged for a new one if the number of writing times in the PROM exceeds the limit.

However, with respect to a conventional microcomputer, the number of writes to the PROM is not recognized by any user as a significant event, malfunctioning of the microcomputer is caused by being overworked after the PROM is broken down.

SUMMARY OF THE INVENTION

It is a first object of the invention to permit a user to know the life of a PROM by checking the number of writes to the PROM.

It is a second object of the invention to control effectively the number of writes to the PROM.

Furthermore, a third object of the invention is to improve the reliability of the microcomputer having an application in an IC card and the like.

It is therefore an object of this invention to provide a microcomputer having a special area in a part of a memory area of the PROM for recording the number of writing times in the PROM and also for renewing the above-mentioned number.

Other objects, features, and advantages of the present invention will be apparent from the following description taken in conjunction with the accompanying drawings.

DESCRIPTION OF THE PREFERRED EMBODIMENTS

Figure 1:
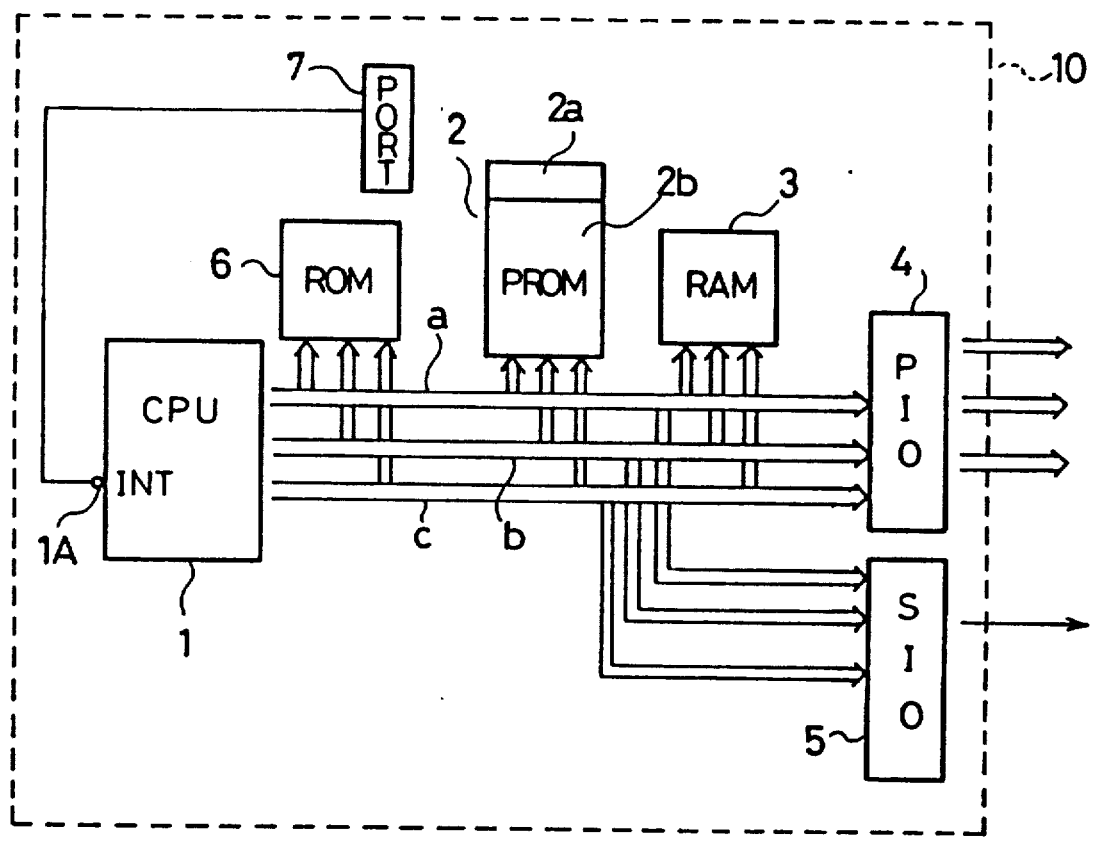
FIG. 1 is a diagram of an embodiment of a microcomputer according to this invention.

FIG. 1 shows a diagram of an embodiment of this invention. As illustrated in FIG. 1, a PROM(2) includes not only a user operating area (2b) but also a special area (2a) which is provided for recording the number of writing times in the PROM(2).

Figure 2:
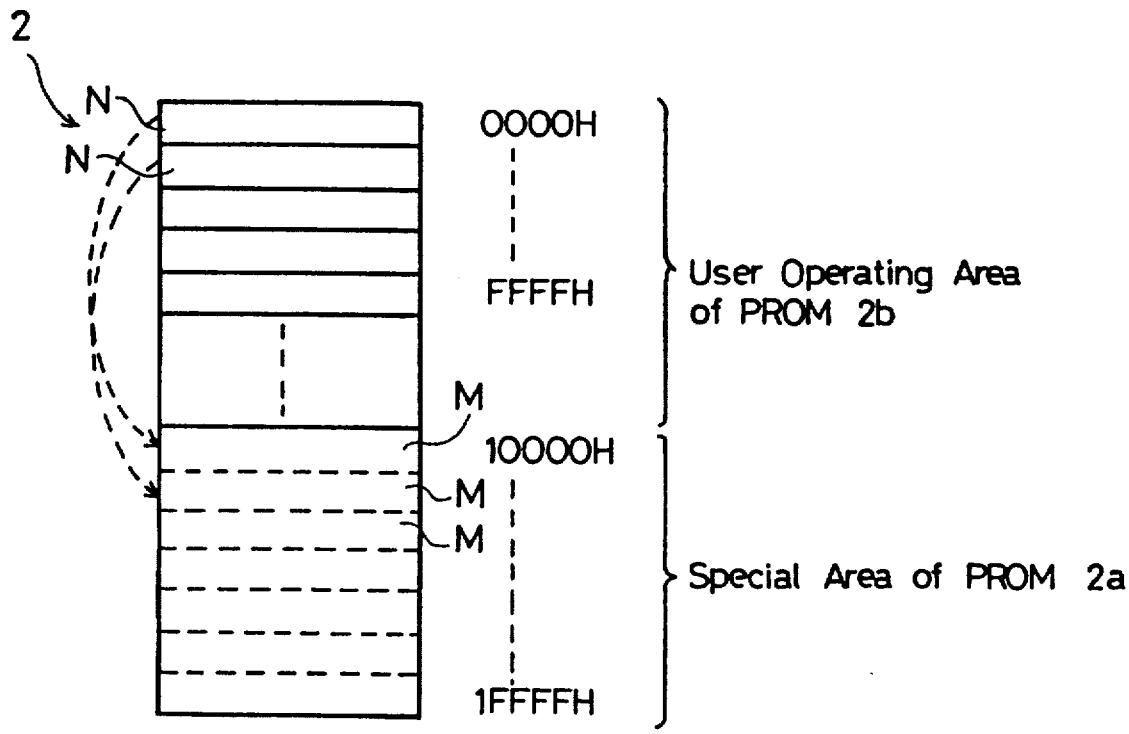
FIG. 2 is a diagram of a PROM according to this invention.
Figure 3:
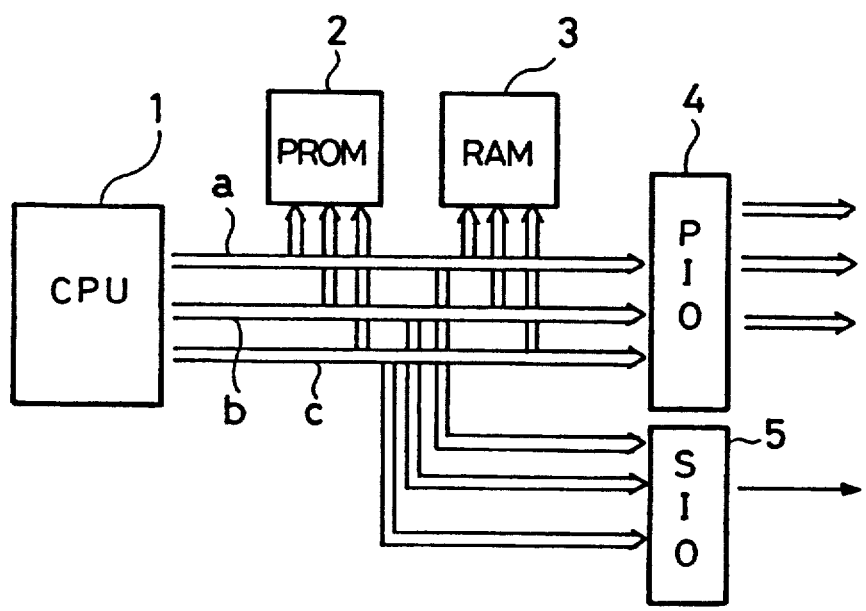
FIG. 3 is a diagram of a conventional microcomputer.

FIG. 2 shows a diagram of a PROM(2).

A microcomputer (10) includes a PORT(7) to which is added a writing signal and a ROM(6) which has stored a program for renewing the number of writing times in the special area (2a) of the PROM(2), at a time when the user operating area (2b) of the PROM(2) is operated in a write mode.

The CPU(1) has an input terminal (INT)(1A) for receiving an interrupt control signal upon receiving the writing signal from the PORT(7) at the time when the writing signal is received at the PORT(7).

Referring to FIG. 2, the special area (2a) of the PROM(2) is prepared such that for each address N of the user operating area (2b) of the PROM(2) corresponds to an address in the special area (2a). Special area (2a) is divided into a small area M for recording the number of writes to the address N.

At the time a particular address of the user operating area (2b) is written, the PORT(7) receives the writing signal and provides the writing signal to the input terminal (INT)(1A) for the interrupt control signal of the CPU(1).

When the interrupt control signal is provided to the input terminal (INT)(1A) for the interrupt control signal, the CPU(1) stops processing momentarily and carries out a program stored in the ROM(6).

By executing the program stored in the ROM(6), the CPU(1) increments the number of writes which has been written in the small area M corresponding to the address N of the user operating area (2b) being used for writing. The initial value of the number of writes is equal to zero.

Then, the writing signal which shows the writing into the PROM(2) and the address which shows the writing point in the user operating area is available to the CPU(1). At every writing operation, the CPU(1) increments the number of writes stored at the address in the special area (2a) corresponding to the address N in the user operating area (2b) which has been written.

Therefore, upon monitoring the whole small area M of the special area (2a) by the CPU(1), it is possible to establish the number of writes in the user operating area (2b) for each address N.

This invention may be applied to an IC card with a built-in PROM. In the case of an application of an IC card as a cash card for a bank, when the number of writes to the PROM exceeds the limit, the IC card would not be available for use and must be exchanged for a new one. Then, the IC card is prevented from malfunctioning, and its reliability is increased.

Furthermore, according to the present invention, since the CPU(1) reads and writes the number of writes to the special area (2a) of the PROM(2), the structure of the invention is simpler than an apparatus composed of discrete parts, for instance a counter and so on. By providing a read out signal to the CPU from an outside apparatus, for example a card apparatus for reading an IC card, it is able to extract the number of writes to the PROM outside of the microcomputer.

While a preferred embodiment of the invention has been described using specific terms, such description is for illustrative purposes only, and it is to be understood that changes and variations may be made without departing from the spirit and scope of the following claims.

What is claimed is:

1. A microcomputer comprising:
a programmable read only memory having a recording area, said recording area including a plurality of addresses for recording data;
input/output means for transferring data relative to outside the micorcomputer; and
a central processing unit for accessing both said programmable read only memory and said input/output means in order to transfer data through a bus, characterized in that
said recording area of said programmable read only memory consists essentially of a first area for recording data and a second area for recording a total number of write operations, wherein each particular one address of said plurality of addresses in said first area has an associated address in said second area;
said central processing unit detects a write operation to a selected particular one address in said first area; and
said central processing unit increments a total number of write operations recorded in a selected associated address in said second area corresponding to said selected particular one address to generate an incremented value representing a new total number of write operations, and said central processing unit records said incremented vlaue to said selected associated address in said second area.

* * * * *